United States Patent [19]

Gerfast

[11] Patent Number: 4,712,977
[45] Date of Patent: Dec. 15, 1987

[54] AXIAL FAN

[76] Inventor: Sten R. Gerfast, 1802 Valley Curve Rd., Mendota Heights, Minn. 55118

[21] Appl. No.: 843,038

[22] Filed: May 27, 1986

Related U.S. Application Data

[62] Division of Ser. No. 627,087, Jul. 2, 1984, Pat. No. 4,610,601.

[51] Int. Cl.$^4$ ............................................. F04D 29/44
[52] U.S. Cl. ...................................................... 415/209
[58] Field of Search ........................ 415/208, 209, 210

[56] References Cited

U.S. PATENT DOCUMENTS

| | | | |
|---|---|---|---|
| 1,586,742 | 6/1926 | Hey | 415/209 |
| 2,159,189 | 5/1939 | Wais | 415/209 |
| 2,371,360 | 3/1945 | Silverberg | 415/209 |
| 2,457,934 | 1/1949 | Spieth | 415/209 |
| 2,618,435 | 11/1952 | Koch | 415/209 |
| 2,628,018 | 2/1953 | Koch | 415/208 |
| 2,652,193 | 9/1953 | Lindberg et al. | 415/209 |
| 3,047,211 | 7/1962 | Hay | 415/209 |
| 3,111,173 | 11/1963 | Klonoski | 416/195 |
| 3,531,221 | 9/1970 | Herberg et al. | 415/209 |
| 4,123,197 | 10/1978 | Keem et al. | 415/209 |
| 4,394,111 | 7/1983 | Wiese et al. | 415/219 R |
| 4,460,312 | 7/1984 | Gerhart | 415/219 R |

FOREIGN PATENT DOCUMENTS 1195012  6/1970  United Kingdom ............... 416/195

Primary Examiner—Robert E. Garrett
Assistant Examiner—John T. Kwon
Attorney, Agent, or Firm—Robert E. Granrud

[57] ABSTRACT

The novel axial fan may have a cylindrical shroud, an impeller mounted coaxially within the shroud, and a bell-shaped deflector extending across the exhaust to redirect the airflow toward radially outward directions. A malleable blank may be cut and shaped to form the impeller having at least three blades, the peripheries of which define a cylinder coaxial with the shroud. The impeller should have a depth-to-radius ratio exceeding 0.5.

12 Claims, 4 Drawing Figures

AXIAL FAN

CROSS REFERENCE TO RELATED APPLICATION

This application is a division of applicant's copending application Ser. No. 627,087, filed July 2, 1984, now U.S. Pat. No. 4,610,601.

FIELD OF THE INVENTION

This invention concerns axial fans, including tube-axial and vane-axial fans, especially an axial fan comprising a cylindrical motor housing and a coaxial cylindrical shroud. The invention is primarily concerned with making axial fans both more economical and efficient.

BACKGROUND ART

Most axial fans exhaust air in the axial direction. When such a fan is mounted in the rear panel of a device being cooled, care must be taken not to position that panel against a wall. Even when there is space between the panel and wall, back pressure from air striking the wall can both reduce the efficiency of the fan and also create an undesirable level of noise. Axial fans are discussed in R. J. Kenny: "Fans and Motors", *Machine Design*, Mar. 14, 1968, pages 158–159.

Some low-cost axial fans are equipped with an impeller made by cutting a flat metal blank into a daisy-like shape, the petals of the daisy being formed into air-driving blades. The blades of more efficient impellers, when formed from metal, may be individually welded to a cylindrical metal hub, so that each blade is supported along its full length. Such welded impellers are considerably more expensive than are those that are formed from a blank. Molded plastic impellers similar to the welded impellers can be equally efficient.

Of axial fan impellers which are known to the inventor, those that have been formed from blanks have a ratio of blade depth to radius between 0.3 and 0.4, whereas that ratio usually exceeds 0.5 in welded and comparable molded plastic impellers. Testing by the inventor indicates that ratios above 0.5 provide greater efficiency.

DISCLOSURE OF INVENTION

The present invention provides an axial fan which can be as inexpensive as the most economical fans having daisy-like impellers and yet can be as efficient as or more efficient than the most expensive axial fans. Tests by the inventor show the novel fan to be significantly more efficient than the best of seven axial fans from four companies, even though all of those fans are of more expensive construction. A basis for the improved efficiency and economy of the novel fan results from its novel impeller which can be formed from a flat malleable blank having n generally radial cuts extending from first points equally spaced along a central circle, n being an integer of at least 3, n symmetrical first spiral cuts, each extending outwardly from a second point on said circle between adjacent first points to a third point on an adjacent generally radial cut, and n symmetrical second spiral cuts extending from fourth points at the outward extremities of the generally radial cuts, each second spiral cut extending generally parallel to the radially adjacent first spiral cut, an extension of each second spiral cut terminating at the next second spiral cut.

Each portion of the blank between radially adjacent first and second spiral cuts is shaped to provide an impeller of n airfoil blades having a depth-to-radius ratio exceeding 0.5. The peripheries of the blades along the n second spiral cuts together generally define a cylinder coaxial with said central circle. Each portion of the blank between said central circle and a first generally radial cut is formed not to extend radially beyond the central circle.

Preferably each of the aforementioned second points is spaced further from the generally radial cut to which its first spiral cut extends than it is to the other adjacent generally radial cut, and the spacing from the latter is the shortest that affords sufficient structural strength, with due regard to the fact that the blank is folded at the base of each blade along the central circle and hence becomes weakest at the fold. To provide good strength, the length of each blade at the fold should be at least 20% of the distance between adjacent first points. The portions of the blank between the central circle and the first spiral cuts may be removed, but preferably are folded 90 degrees in the same direction as the blades are folded, together approximately defining a cylinder having a radius substantially equal to that of the central circle. Such folds have a desirable reinforcing effect and may also reduce turbulence at the inner edges of the blades.

In the blank, each second spiral cut preferably diverges from the radially adjacent first spiral cut at least to a point (the fifth numbered point of the blank) which is substantially aligned with the generally radial cut at which that first spiral cut terminates. From the fifth point, the aforementioned extension of the second cut may turn abruptly to coincide substantially with that generally radial cut. Preferably the extension gradually turns from the fifth point to intersect with the next second spiral cut at a point (the sixth numbered point of the blank) that either coincides with the fourth point or is beyond the fourth point, in which event a small portion of each blade extends radially beyond an adjacent blade before the blank is formed into an impeller.

The novel impeller may be used in an axial fan having a cylindrical shroud, and the efficiency of the axial fan is enhanced when the diameter of the cylinder defined by the blade peripheries is only slightly smaller than the inside diameter of the shroud. For optimum efficiency, the peripheries of the blades near their leading edges and along their central portions lie in the aforementioned cylinder, but it is believed that vibration, and hence noise, may be reduced when the periphery of each blade in the vicinity of its trailing edge tapers inwardly from that cylinder toward that trailing edge. Vibration is also reduced by fitting a thin reinforcing ring around the blades near their trailing edges. This also permits the blades to be quite thin, thus further enhancing efficiency. The ring may be a metal wire such as steel and may fit into notches in the peripheries of the blades. Preferably the ring is slightly undersize to remain snugly in place by elastically flexing the blades slightly inwardly. The ring becomes even more secure during fan rotation as a result of centrifugal forces.

The malleable blank preferably is an economical, lightweight metal such as aluminum. Tooling for cutting and forming aluminum is relatively inexpensive. Malleable plastic sheeting also is useful. By using malleable blanks of uniform thickness and weight, the novel impellers are inherently balanced.

Except for somewhat higher tooling costs, there should be virtually no difference in the cost of producing impellers having an increased number of blades. Hence, it should be economical to produce impellers having the number of blades that affords the highest efficiency.

A second basis for the improved efficiency of the novel axial fan is that it can exhaust air radially and thus can be mounted in a peripheral panel of a device to be cooled and nevertheless can operate efficiently when that panel is placed against a wall. This is accomplished in that the novel axial fan can comprise a cylindrical shroud defining an axial air passage, an impeller mounted coaxially within the shroud and rotatable to force air helically through the passage, and bell-shaped deflector means coaxially positioned to extend partially across the air passage at the exhaust to redirect the airflow toward radially outward directions.

Most axial fans have a cylindrical housing positioned coaxially within the shroud. The cylindrical housing may contain a motor or only bearings for the impeller. The bell-shaped deflector means may comprise a single circular deflector plate, or it may comprise coaxial first and second circular deflector plates, the first plate being bell-shaped and integral with the cylindrical housing and having a diameter which is small compared to that of the shroud at the exhaust. The second plate may be dish-shaped and downstream from the first and have its convex surface facing the impeller. While its diameter is larger than the first plate, it is smaller than the inside diameter of the shroud. At the exhaust, the shroud may have a bell-shaped opening to enhance redirecting of the air flow toward radially outward directions.

For simplicity of construction, there should be struts connecting a cylindrical housing to the shroud, and those struts preferably extend across the air passage at the exhaust so that the intake can be unobstructed. The struts preferably are as narrow as possible while providing good structural integrity. When struts extend across the air passage at the exhaust, they preferably are canted to assist in redirecting the air flow toward radially outward directions. The struts may also be curved to enhance laminar flow of the air. When the novel axial fan has a single deflector plate, the struts may be integral with that plate. When the fan has coaxial first and second circular deflector plates as described above, the struts may be integral with the first deflector plate.

THE DRAWING

In the drawing

Figure 1:
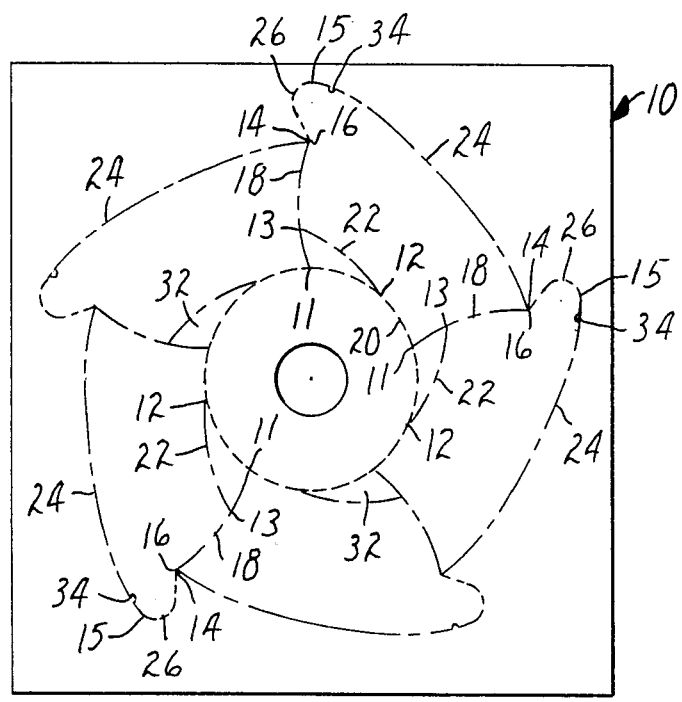
FIG. 1 shows a malleable blank which has been cut in the first step of making an impeller of the invention.

Referring first to FIG. 1, an aluminum blank 10 has six sets of significant points numbered 11-16. Because the blank is to be formed into a 5-blade impeller, each of the six numbered points has five locations. Five generally radial cuts 18 extend from first points 11 which are equally spaced along a central circle 20. Each of second points 12 is positioned on the circle 20 between adjacent first points 11. One of five symmetrical spiral first cuts 22 extends from each of the second points 12 to a third point 13 on an adjacent generally radial cut 18. Beginning at each of five fourth points 14 at the outward extremity of each generally radial cut 18, one of five symmetrical second spiral cuts 24 extends generally parallel to, but diverges from, the radially adjacent first spiral cut 22, reaching a fifth point 15 which is substantially aligned with the generally radial cut 18 at which that first spiral cut terminates. An extension 26 of each second spiral cut 24 gradually turns from the fifth point 15 to intersect with the next second spiral cut at a sixth point 16 along the next second spiral cut 24. In the illustrated blank 10, the sixth point 16 coincides with the fourth point 14, but the extension could turn more gradually to intersect the next second spiral cut at a point counter-clockwise from the fourth point 14.

Figure 2:
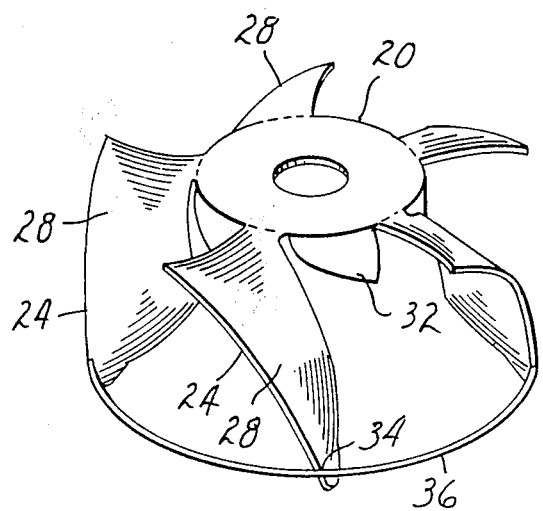
FIG. 2 is a perspective view of the impeller formed from the blank of FIG. 1.

Each portion of the blank 10 between radially adjacent first and second spiral cuts 22 and 24 becomes a blade 28 of an impeller when that portion is folded along the central circle 20 and formed into an air-driving shape as shown in FIG. 2. Upon forming the blades 28, their peripheries along the second spiral cuts 24 define a cylinder which is coaxial with the circle 20. At the same time, portions 32 of the blank 10 between the central circle 20 and first spiral cuts 22 are folded along the circle to form together a cylinder having substantially the same diameter as the central circle. Notches 34 in the periphery of each blade 28 receive a wire reinforcing ring 36 which is slightly undersize to flex the blades inwardly.

Figure 3:
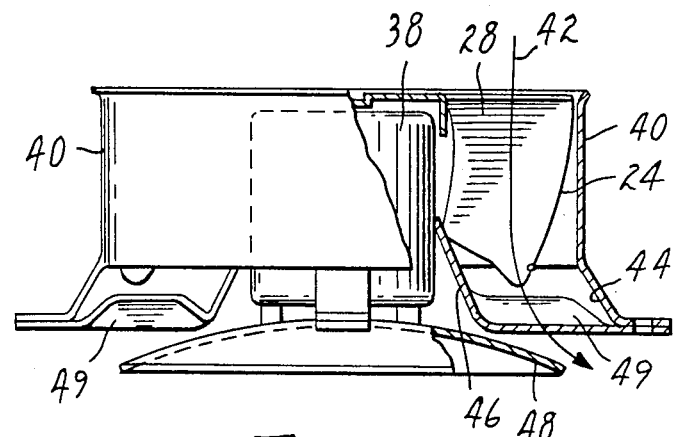
FIG. 3 is a central cross-section of an axial fan of the invention including the impeller of FIG. 2.

The impeller formed from the blank 10 is mounted coaxially with a cylindrical motor housing 38 of an axial fan as shown in FIG. 3. Between the motor housing 38 and a coaxial cylindrical shroud 40 is an axial air passage through which air is driven helically in the direction of an arrow 42. The diameter of the cylinder defined by the second spiral cuts 24 at the peripheries of the blades 28 is slightly smaller than the inside diameter of the shroud 40. At the exhaust, the shroud has a bell-shaped opening 44.

Mounted at the exhaust are first and second circular deflector plates, the first plate 46 being bell-shaped and bonded to the motor housing 38. The end of the bell shape is small compared to that of the shroud 40 at the exhaust. The second plate 48 is dish-shaped and downstream from the first, of larger diameter, and has its convex surface facing the impeller.

Four struts 49, which are integral with the first deflector plate 46, connect the motor housing 38 to the shroud 40. The struts 49 are canted to assist in redirecting the airflow toward radially outward directions. The struts 49 also are slightly curved, it being believed that this curvature enhances laminar airflow. Then when the air strikes the deflector plates 46, 48, it is further redirected toward radially outward directions.

Figure 4:
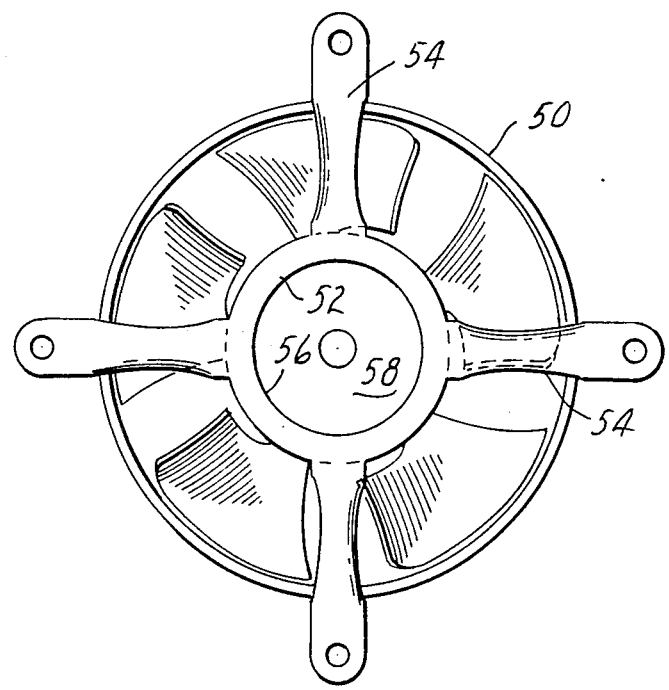
FIG. 4 is a plan view of a second axial fan of the invention looking into the exhaust.

In the second axial fan shown in FIG. 4 which has a cylindrical shroud 50, there is only one deflector plate 52 with which four struts 54 are integral. The central area of the deflector plate 52 is bell-shaped, and at its inside diameter 56, it is secured to the outside diameter of a cylindrical housing 58.

EXAMPLE

An axial fan as illustrated in FIG. 1, except having no reinforcing ring 36, has been constructed as follows:

| | |
|---|---|
| Blank 10, struts 49, and deflectors: | Aluminum, 0.75 mm in thickness |
| Circle 20: | Radius of 1.82 cm |
| Cylinder formed by blades along spiral cuts 24: | Radius of 3.81 cm |
| Depth of blades 28: | 3.12 cm |
| Depth/radius ratio: | 0.82 |
| Shroud: | Inside radius of 3.84 cm |
| Motor in housing 38: | 12 V DC brushless, 0.4 Amperes at 3250 rpm |

A similar axial fan has been constructed with a wire reinforcing ring. Both fans are surprisingly efficient and in other respects perform more efficiently than do axial fans of the prior art that have been available to the inventor.

I claim:

1. Axial fan comprising
   a substantially cylindrical shroud defining an axial air passage,
   an impeller of n airfoil blades, n being an integer of at least 3, mounted coaxially within the shroud and rotatable to force air helically through the passage, the peripheries of the blades together generally defining a cylinder slightly smaller than the inside diameter of the shroud, the length of each blade at said cylinder being at least 20% of the distance between identical points on adjacent blades along said cylinder, and the blades having a depth-to-radius ratio exceeding 0.5, and
   bell-shaped deflector means coaxially positioned to extend at least partially across the air passage at the exhaust to redirect the airflow toward radially outward directions, said deflector means comprising coaxial first and second circular deflector plates, the first plate being bell-shaped and integral with the motor housing and having a diameter which is small compared to that of the shroud at the exhaust, and the second plate being dish-shaped and downstream from the first plate, of larger diameter, and having a convex surface facing the impeller.

2. Axial fan as defined in claim 1 wherein said impeller is a single piece of malleable material.

3. Axial fan as defined in claim 2 wherein said malleable material is a sheet of an economical lightweight metal.

4. Axial fan as defined in claim 3 wherein said metal sheet forms a cylinder at the inner radius of the blades.

5. Axial fan as defined in claim 1 wherein a cylindrical housing is positioned coaxially within the shroud, a plurality of narrow flat struts connect the motor to the housing, and the struts are integral with said first deflector plate.

6. Axial fan as defined in claim 1 having a cylindrical housing positioned coaxially within the shroud.

7. Axial fan as defined in claim 6 wherein the cylindrical housing contains a motor for driving the impeller.

8. Axial fan as defined in claim 7 wherein a plurality of narrow flat struts extend across the exhaust end of the axial air passage to connect the motor housing to the shroud, which struts are canted to redirect the helical airflow toward radially outward directions.

9. Axial fan as defined in claim 1 wherein the peripheries of the blades near their leading edges and along their central portions lie substantially in said cylinder and the periphery of each blade in the vicinity of its trailing edge tapers inwardly from said cylinder toward that trailing edge.

10. Axial fan as defined in claim 1, the impeller of which has a thin reinforcing ring around its blades near their trailing edges.

11. Axial fan as defined in claim 10 wherein the reinforcing ring is a wire.

12. Axial fan as defined in claim 11 wherein said blades are formed with notches into which the wire ring fits, and the ring is slightly undersize to flex the blades slightly inwardly.

* * * * *